(12) United States Patent  (10) Patent No.: US 7,721,620 B2
Matsui et al.                (45) Date of Patent:    May 25, 2010

(54) ADJUSTABLE STEERING APPARATUS (75) Inventors: Isao Matsui, Nara (JP); Yota Uesaka, Toyohashi (JP)

(73) Assignees: JTEKT Corporation, Osaka-Shi, Osaka (JP); Fuji Kiko Co., Ltd., Kosai-Shi, Shizuoka (JP)

( * ) Notice: Subject to any disclaimer, the term of this patent is extended or adjusted under 35 U.S.C. 154(b) by 227 days.

(21) Appl. No.: 11/892,904

(22) Filed: Aug. 28, 2007

(65) Prior Publication Data
US 2008/0053264 A1    Mar. 6, 2008

(30) Foreign Application Priority Data
Aug. 30, 2006 (JP) ............................. 2006-232995

(51) Int. Cl.
*B62D 1/18* (2006.01)
(52) U.S. Cl. ........................................ 74/493; 280/775
(58) Field of Classification Search .................. 74/492, 74/493; 280/775
See application file for complete search history.

(56) References Cited

U.S. PATENT DOCUMENTS 4,732,050 A * 3/1988 Vollmer ........................ 74/493
5,743,150 A * 4/1998 Fevre et al. .................... 74/493
6,092,957 A * 7/2000 Fevre et al. ................. 403/373
2004/0261565 A1  12/2004 Uphaus et al.
2008/0053264 A1 * 3/2008 Matsui et al. .................. 74/493

FOREIGN PATENT DOCUMENTS

DE    102 34 514 B3    1/2004
JP    8-99640 A         4/1996
JP    2004-1758 A       1/2004

* cited by examiner

*Primary Examiner*—Richard W Ridley
*Assistant Examiner*—Terence Boes
(74) *Attorney, Agent, or Firm*—Birch, Stewart, Kolasch & Birch, LLP (57) ABSTRACT An adjustable steering apparatus includes: a movable bracket to which a steering jacket having a steering wheel is fixed and to which a movable telescopic member having a tooth portion is fixedly mounted; a stationary bracket which is disposed externally of the movable bracket and fixed to a vehicle body, and to which a stationary tilt member having a tooth portion is fixedly mounted; a movable tilt member having a tooth portion meshingly engageable with the tooth portion of the stationary tilt member; and a stationary telescopic member having a tooth portion meshingly engageable with the tooth portion of the movable telescopic member. Both the movable tilt member and the stationary tilt member have openings. The tooth portion of the stationary telescopic member is designed to be meshed with the tooth portion of the movable telescopic member as penetrating through the movable tilt member and stationary tilt member.

3 Claims, 9 Drawing Sheets

PRIOR ART

FIG. 9

PRIOR ART

ADJUSTABLE STEERING APPARATUS

BACKGROUND OF THE INVENTION

The present invention relates to an adjustable steering apparatus. More particularly, the invention relates to an adjustable steering apparatus which utilizes a tooth-to-tooth meshing engagement for fixing or releasing a steering jacket including a steering wheel.

A tiltable, telescopic steering apparatus has been known which permits a steering wheel in front of a driver to be tilted upward or downward for tilt adjustment and to be axially extended or retracted for adjustment in order that the driver may drive in an optimum position.

Such a steering apparatus generally has a constitution wherein the steering jacket (jacket tube) rotatably supporting a column shaft having the steering wheel mounted to its distal end is fixed to a movable bracket vertically movable as clamped by an upper clamp (stationary bracket) fixed to a vehicle body. An operation lever is fixed to a nut in threaded engagement with a clamp bolt penetrating through these brackets. The operation lever is turned thereby operating a cam mechanism for causing the stationary bracket to clamp the movable bracket. A frictional force occurring between these brackets is used to fix the steering jacket to place.

By the way the following problem exists in the case where the frictional force between the stationary bracket and the movable bracket is used to fix the movable bracket to place, thereby to fix the steering jacket to place. If a greater force than the frictional force is applied to the steering jacket, the steering jacket slidably moves within the stationary bracket forwardly or upwardly, so that the steering wheel is shifted from an initial set position. For instance, if the driver hits against an air bag at collision so that an excessive input is applied to the steering jacket via the air bag, the fixation position of the steering jacket is displaced. As a result, the air bag may be deployed in an improper position. The air bag may not work sufficiently effectively unless the driver hits against the air bag squarely. If the driver hitting against the air bag displaces the steering jacket from its fixation position so that the air bag is shifted forwardly or upwardly relative to the vehicle body, the air bag may not be able to exhibit its performance fully.

In this connection, a steering apparatus has been proposed which adopts a fixing method based on the tooth-to-tooth meshing engagement in place of the fixing method based on the frictional force.

Figure 8:
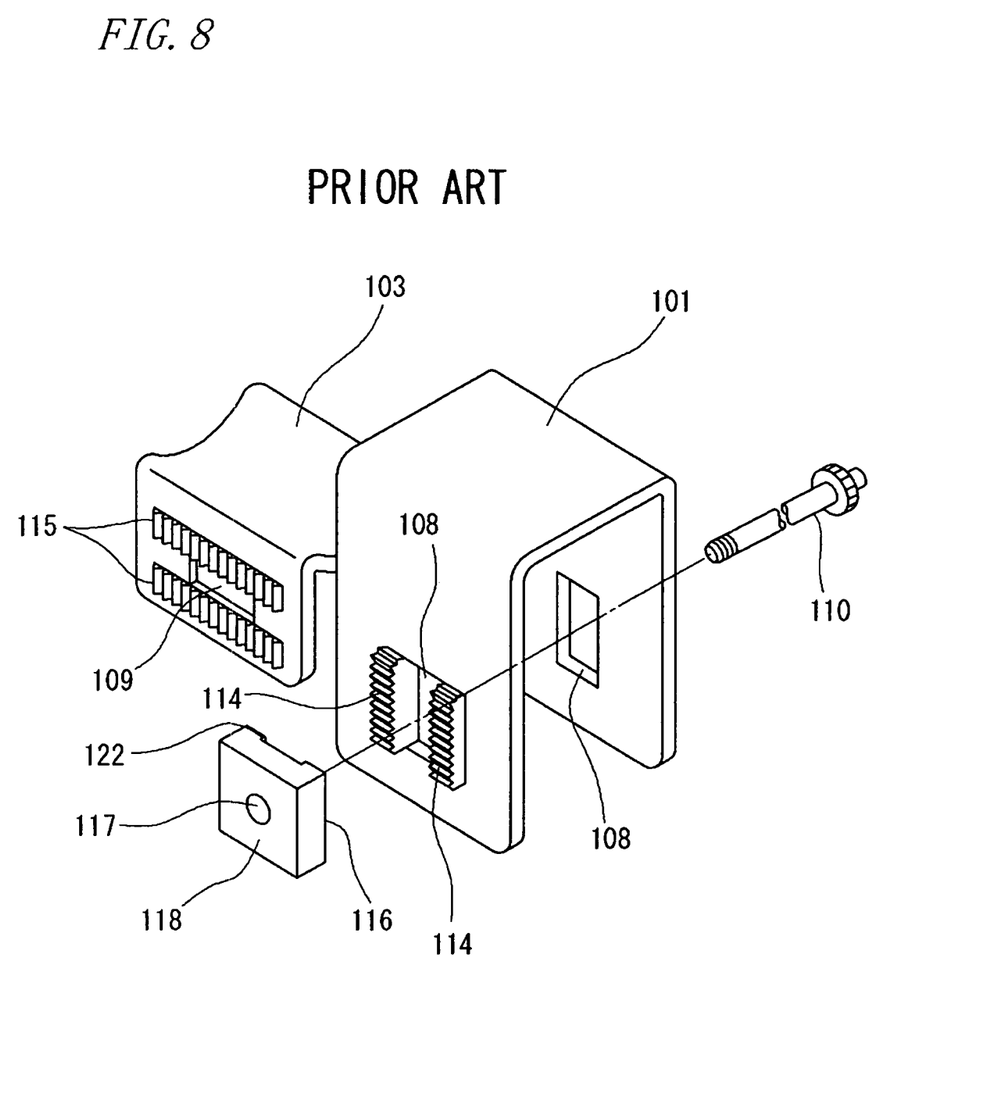
FIG. 8 is an exploded perspective view showing an essential part of a conventional steering column.
Figure 9:
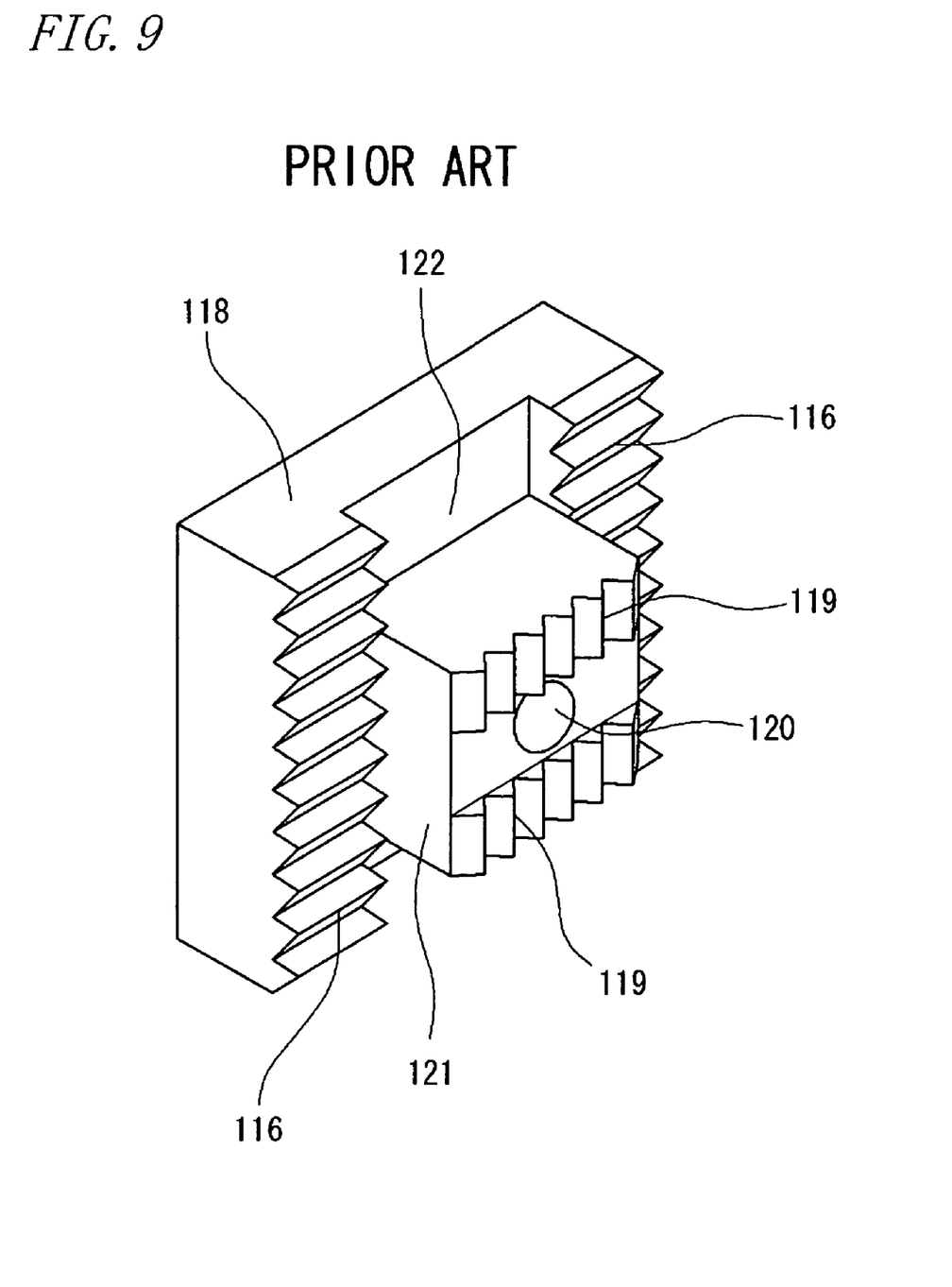
FIG. 9 is a partly rear elevational and perspective view of FIG. 8.

As shown in FIG. 8 and FIG. 9, for example, Japanese Unexamined Patent Publication No. 99640/1996 discloses a tiltable, telescopic steering column wherein an operation lever (not shown) is axially movably fitted with a clamp bolt 110 penetrating through an elongated hole 108 for tilting formed in an upper clamp 101 and through an elongated hole 109 for telescoping formed in a distance bracket 103. A tilt-lock tooth portion 114 is formed on an edge of the elongated hole 108 for tilting, whereas a telescopic-lock tooth portion 115 is formed on an edge of the elongated hole 109 for telescoping. A first movable member 118 having a lock tooth portion 116 meshingly engageable with the tilt-lock tooth portion 114 and a second movable member 121 having a lock tooth portion 119 meshingly engageable with the telescopic-lock tooth portion 115 are assembled to the clamp bolt 110 in such a manner that the movable members may be pressed against the upper clamp 101 and the distance bracket 103, respectively. The clamp bolt 110 penetrates through bolt-through holes 117, 120 formed in the first movable member 118 and the second movable member 121. The first movable member 118 is formed with a vertical groove 122 for engagement with the second movable member 121.

The steering column disclosed in Japanese Unexamined Patent Publication No. 99640/1996 operates as follows. When the operation lever is turned to clamp the distance bracket 103 by means of the upper clamp 101, the lock tooth portion 116 of the first movable member 118 is meshed with the tilt-lock tooth portion 114 so as to inhibit the vertical movement of the clamp bolt 110. In the meantime, the lock tooth portion 119 of the second movable member 121 is meshed with the telescopic-lock tooth portion 115 so as to inhibit the distance bracket 103 from moving forwardly or rearwardly relative to the vehicle body. As a result, the steering wheel is prevented from shifting from the set position in spite of the excessive input overcoming the clamping force of the clamp bolt 110.

According to the steering column of the above patent publication, however, the first movable member 118 for tilting and the second movable member 121 for telescoping are adapted to move in unison so that the meshing relations between the respective tooth portions of the movable members and individually corresponding tooth portions affect each other. This dictates the need to set high dimensional accuracies of the finished tooth portions. With low dimensional accuracies, the tooth portions are in poor meshing engagement, failing to achieve a positively fixed condition. That is, such high dimensional accuracies as to simultaneously establish the meshing engagements between the lock tooth portion 116 of the first movable member 118 and the tilt-lock tooth portion 114 and between the lock tooth portion 119 of the second movable member 121 and the telescopic-lock tooth portion 115 are required, which results in difficult manufacture process and assembly process.

SUMMARY OF THE INVENTION

In view of the foregoing, the invention seeks to provide an adjustable steering apparatus which permits the tooth portion for tilting and the tooth portion for telescoping to be meshed with respective counterpart members in a mutually independent manner and which is easy to manufacture and to assemble.

In accordance with the invention, an adjustable steering apparatus permitting tilting and telescopic motions of a steering wheel, comprises:

a movable bracket to which a steering jacket including the steering wheel is fixed and to which a movable telescopic member having a tooth portion is fixedly mounted;

a stationary bracket which is disposed externally of the movable bracket and fixed to a vehicle body, and to which a stationary tilt member having a tooth portion is fixedly mounted;

a movable tilt member having a tooth portion meshingly engageable with the tooth portion of the stationary tilt member; and a stationary telescopic member having a tooth portion meshingly engageable with the tooth portion of the movable telescopic member, and is characterized in that both the movable tilt member and the stationary tilt member have openings and that the tooth portion of the stationary telescopic member is designed to be meshed with the tooth portion of the movable telescopic member as penetrating through the movable tilt member and stationary tilt member.

The adjustable steering apparatus of the invention is constituted such that both the movable tilt member and the stationary tilt member have the openings and that the tooth portion of the stationary telescopic member is designed to be meshed with the tooth portion of the movable telescopic member as penetrating through the movable tilt member and stationary tilt member. Therefore, the four members of the movable tilt member, stationary tilt member, movable telescopic member and stationary telescopic member may be disposed in coaxial relation, so that these members may be assembled easily. Further, the movable tilt member and the stationary telescopic member are mutually independently movable in an axial direction. In other words, the meshing engagement between the tooth portion of the movable tilt member and the tooth portion of the stationary tilt member and the meshing engagement between the tooth portion of the movable telescopic member and the tooth portion of the stationary telescopic member do not affect each other. This negates the need for setting the dimensional accuracies of these finished tooth portions as high as in the constitution wherein these tooth portions are to be simultaneously brought into meshing engagement. As a result, the steering apparatus may be manufactured easily and at lower costs.

It is preferred that an elastic body for meshing engagement which is capable of urging the stationary telescopic member toward the movable telescopic member is disposed on the opposite side from the tooth portion of the stationary telescopic member. In this case, the tooth portion of the stationary telescopic member and the tooth portion of the movable telescopic member are brought into meshing engagement by way of the elastic force. The elastic body for meshing engagement can accommodate more dimensional errors as compared with a case where the meshing engagement between the tooth portion of the movable tilt member and the tooth portion of the stationary tilt member and the meshing engagement between the tooth portion of the stationary telescopic member and the tooth portion of the movable telescopic member are both accomplished by way of an axial force of the clamp bolt. Therefore, the dimensional accuracies of the finished teeth may be lowered while these members may be assembled easily.

DETAILED DESCRIPTION

An adjustable steering apparatus according to an embodiment of the invention will hereinbelow be described in greater details with reference to the accompanying drawings.

Figure 1:
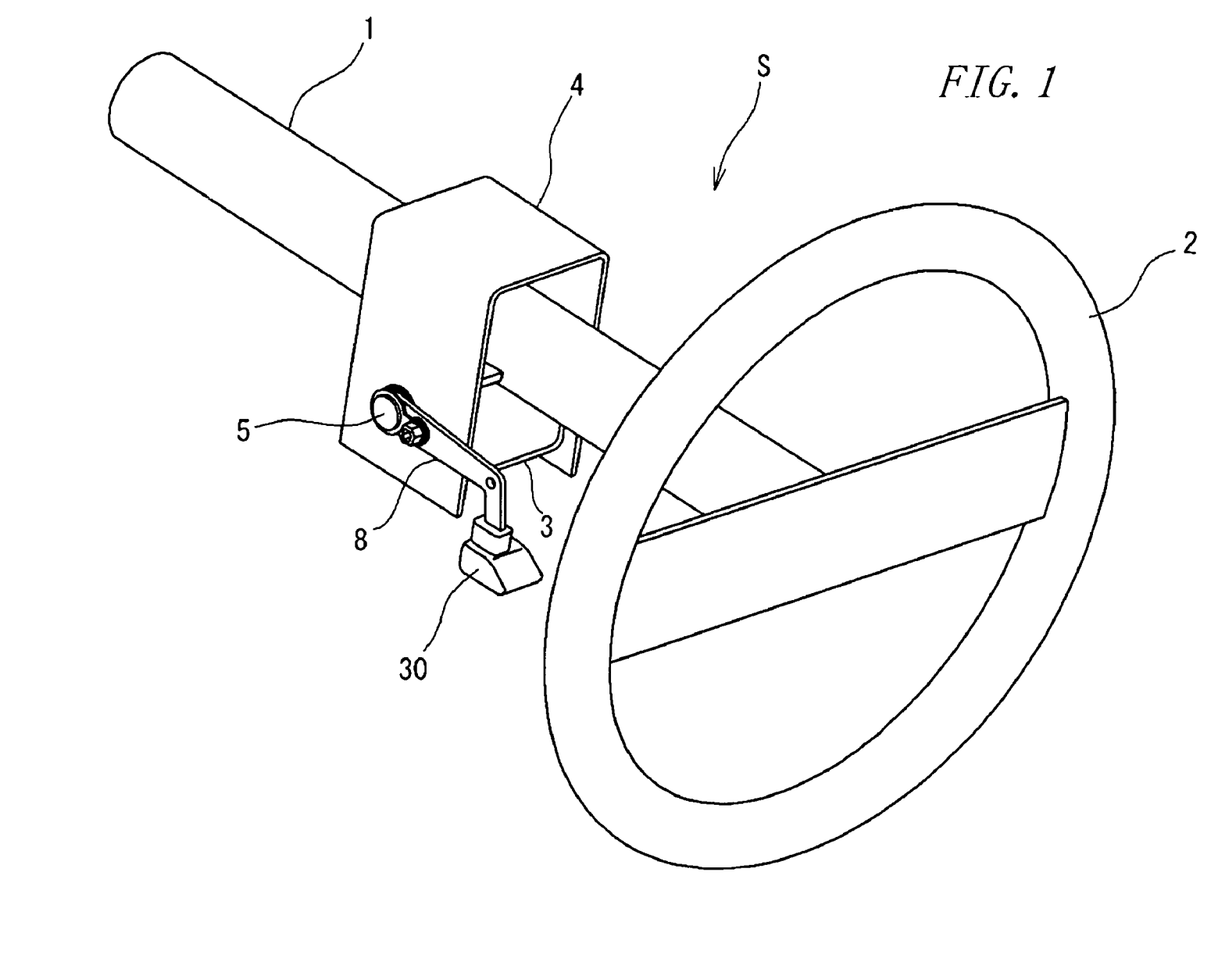
FIG. 1 is a perspective view showing an essential part of an adjustable steering apparatus according to one embodiment of the invention.
Figure 2:
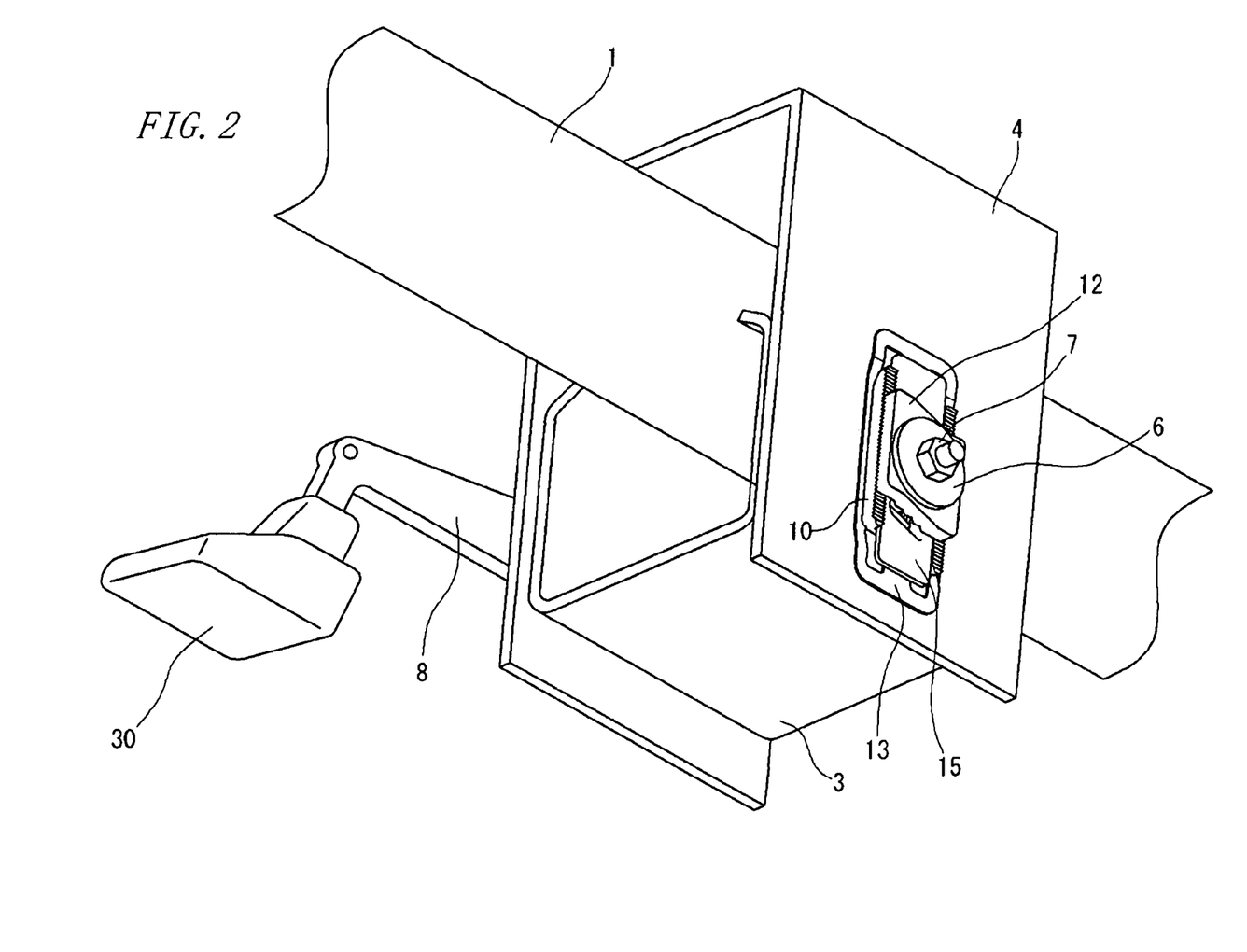
FIG. 2 is an enlarged fragmentary view of the adjustable steering apparatus shown in FIG. 1.

FIG. 1 is a perspective view showing an essential part of an adjustable steering apparatus S according to one embodiment of the invention. FIG. 2 is an enlarged fragmentary view of the adjustable steering apparatus S shown in FIG. 1.

The adjustable steering apparatus S according to the embodiment is a steering apparatus which permits tilting and telescopic motions of a steering wheel 2 mounted to a distal end or an upper end (vehicular rearward end portion) of a column shaft (not shown) rotatably supported by a steering jacket 1. The steering apparatus includes: a movable bracket 3 to which the steering jacket 1 is fixed; and a stationary bracket 4 disposed externally of the movable bracket 3 and fixed to a vehicle body (not shown). A disk-like washer 6 is disposed at place near one end of a clamp bolt 5 (see FIG. 5 and FIG. 6) extending through these brackets 3, 4. The clamp bolt 5 extends through the washer 6, which is free to rotate about the clamp bolt 5. The term "outer side", as used herein, means the side at the end of the clamp bolt 5 extending through the movable bracket 3 and the stationary bracket 4 which constitute the adjustable steering apparatus S. On the other hand, the term "inner side", as used herein, means the opposite side to the above.

Figure 7:
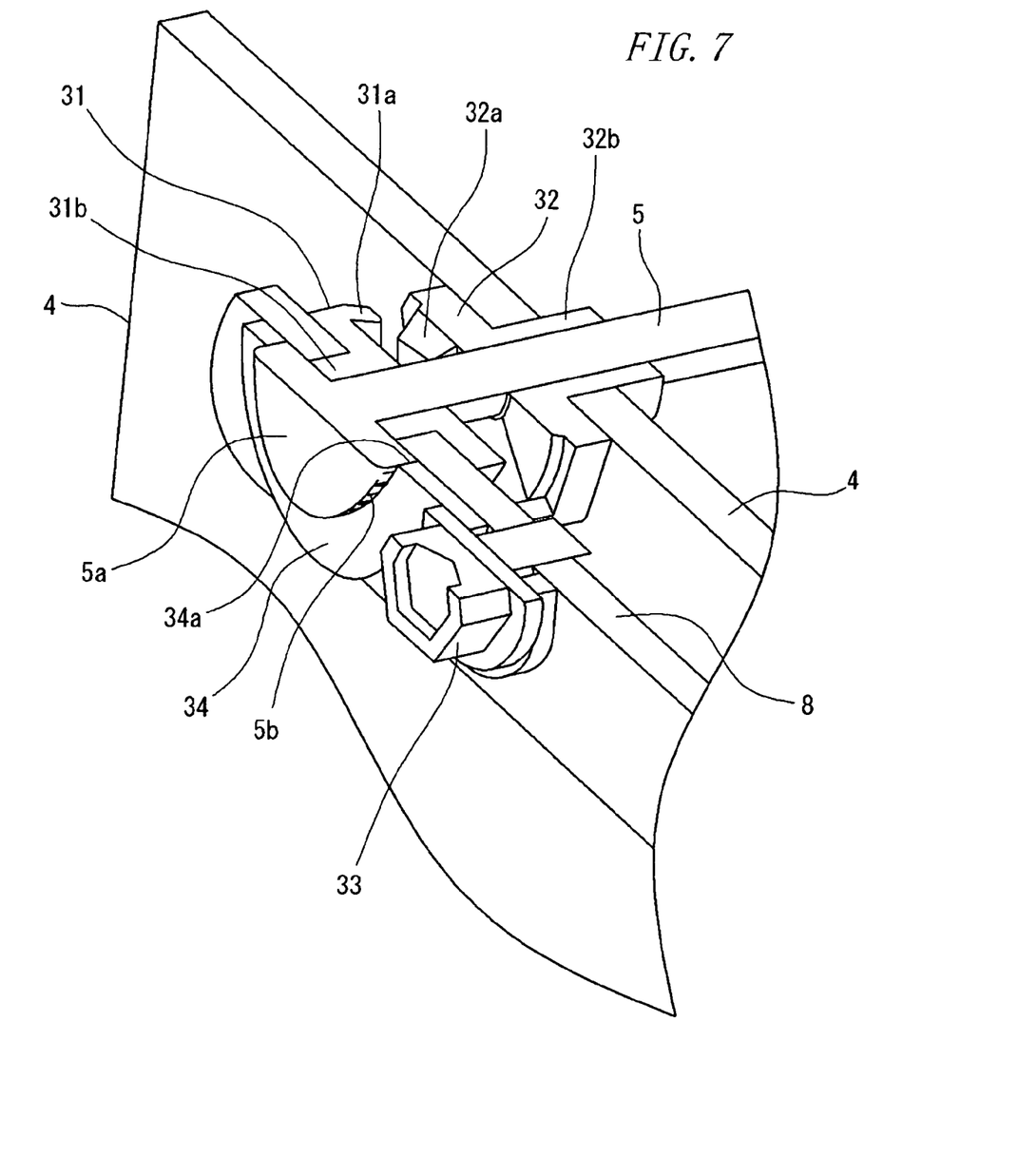
FIG. 7 is a fragmentary sectional view of the adjustable steering apparatus shown in FIG. 1 as viewed from an operation-lever side.

The clamp bolt 5 also has a nut 7 secured to the end portion where the washer 6 is disposed and at place outer side of the washer 6. As shown in FIG. 1 and FIG. 7, on the other hand, an operation lever 8 has a proximal end portion fixed to the other end portion of the clamp bolt 5 in a manner to be unitarily rotatable with the clamp bolt 5. A grip portion 30 used for operatively turning the operation lever 8 is a mounted to a distal end of the operation lever 8. A base portion 31b of a first cam 31 including a slant portion 31a is fitted in an opening formed at the proximal end portion of the operation lever 8. On the other hand, a base portion 32b of a second cam 32 including a slant portion 32a is fitted in an opening formed in the stationary bracket 4. The slant portion 31a and the slant portion 32a are disposed in opposing relation and jointly constitute a cam mechanism. The cam mechanism is operated by operatively turning the operation lever 8 whereby the clamp bolt 5 is axially moved a given distance. The clamp bolt 5 has a disk-like head 5a at the end thereof, on outer periphery of which is formed with a serration 5b. A serration (not shown) meshed with this serration 5b is formed in an inner periphery of a hole 34a formed in a calabash-shaped plate 34 fixed to the operation lever 8 by means of a cap bolt 33.

The adjustable steering apparatus of the invention utilizes tooth-to-tooth meshing engagement for fixing or releasing the steering jacket 1. For this purpose, the embodiment has a constitution wherein a movable telescopic member 9 having a tooth portion 9a is fixedly mounted to the movable bracket 3, whereas a stationary tilt member 10 having a tooth portion 10a is fixedly mounted to the stationary bracket 4. Further, a stationary telescopic member 11 is disposed in correspondence to the movable telescopic member 9 and has a tooth portion 11a meshingly engageable with the tooth portion 9a of the movable telescopic member 9. On the other hand, a movable tilt member 12 is disposed in correspondence to the stationary tilt member 10 and has a tooth portion 12a meshingly engageable with the tooth portion 10a of the stationary tilt member 10. These movable telescopic member 9, stationary tilt member 10, stationary telescopic member 11 and movable tilt member 12 are coaxially disposed about the clamp bolt 5. The stationary telescopic member 11 and the movable tilt member 12 are designed to move along the axial direction of the clamp bolt 5.

Figure 3:
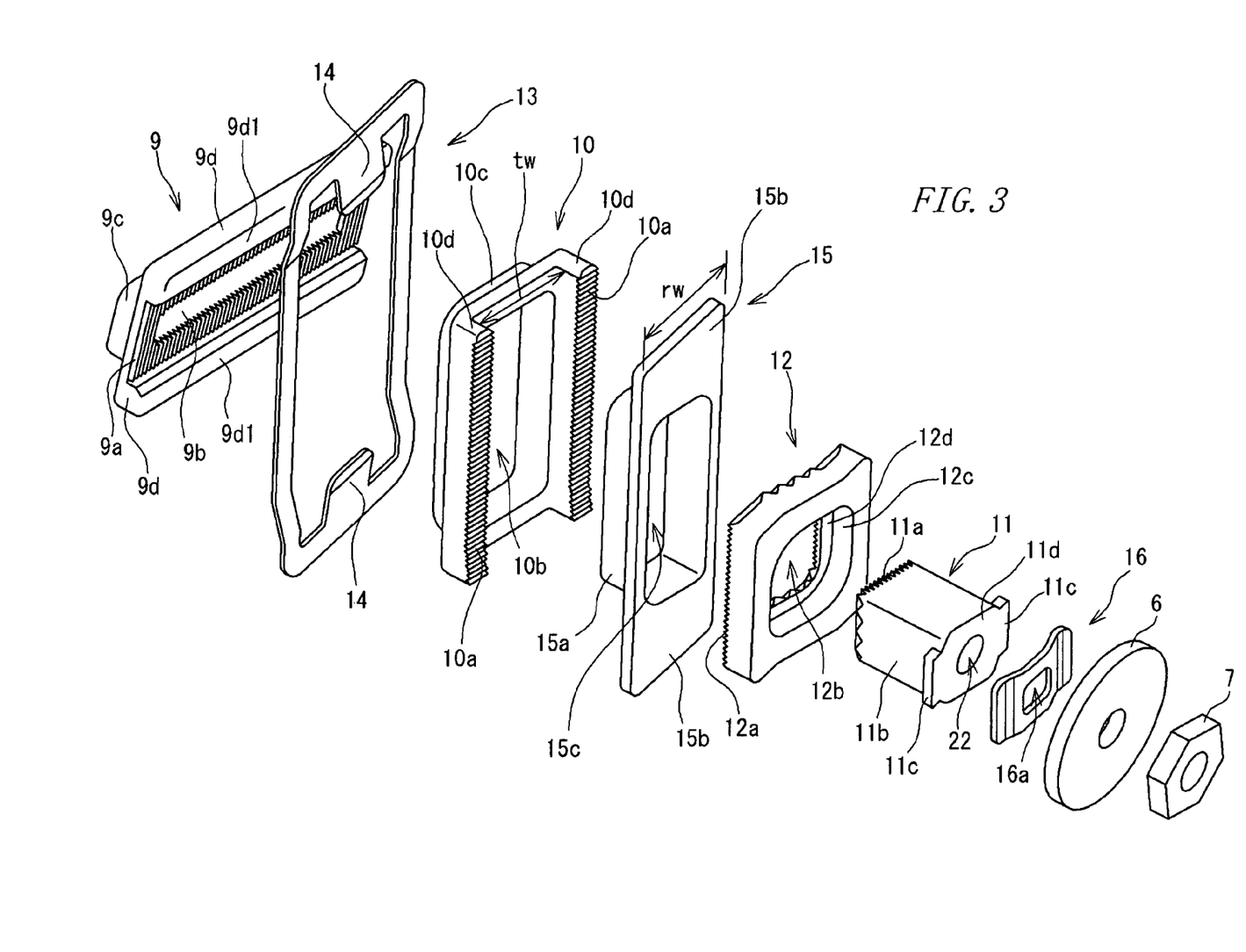
FIG. 3 is an exploded view illustrating the essential part of the adjustable steering apparatus shown in FIG. 1.
Figure 4:
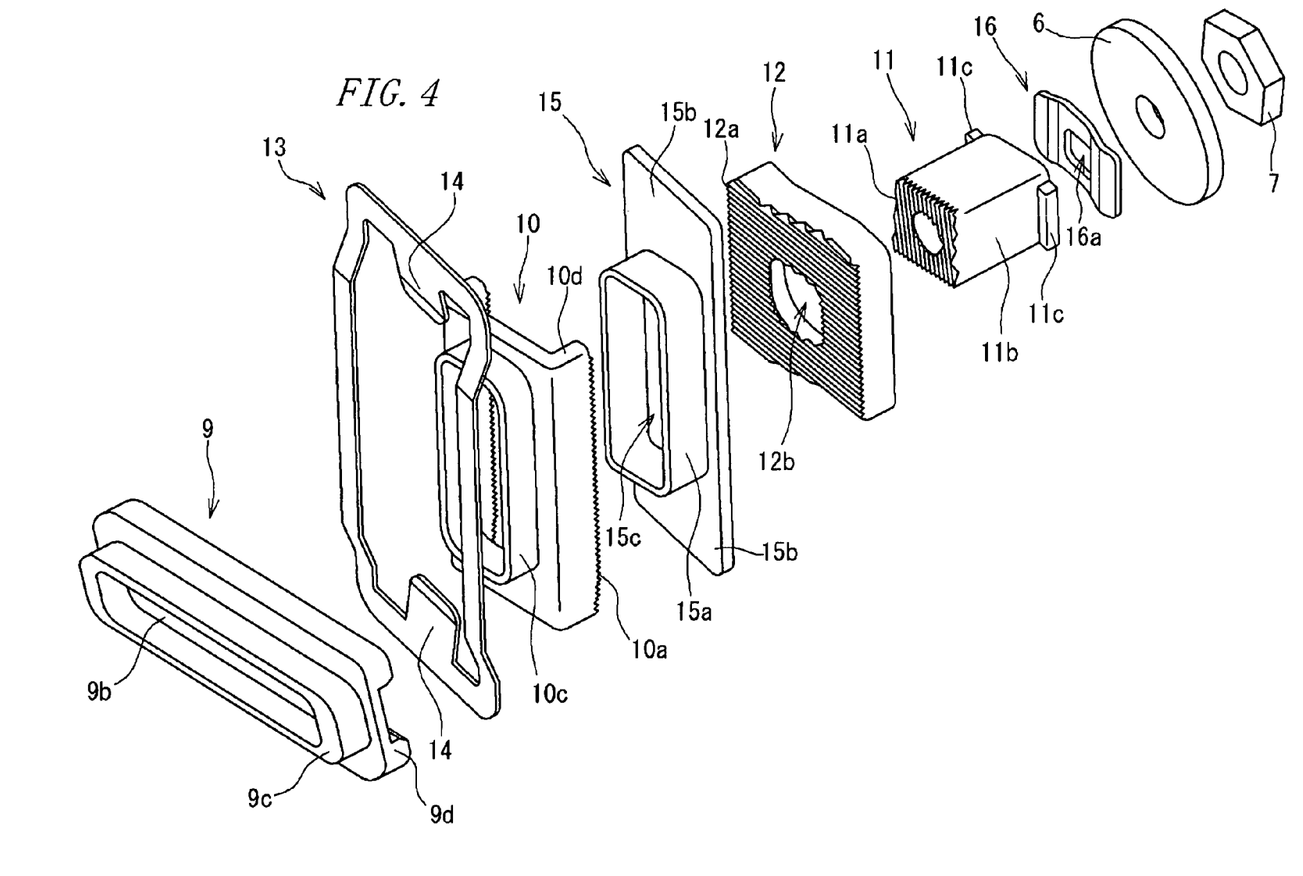
FIG. 4 is an exploded view illustrating the essential part of the adjustable steering apparatus shown in FIG. 1.

Next, description is made on the individual members 9, 10, 11, 12 with reference to FIG. 3 and FIG. 4.

The movable telescopic member 9 has a rectangular shape and is longitudinally formed with an opening 9b having such a width as to allow the clamp bolt 5 to penetrate therethrough. The movable telescopic member 9 is formed with a wall 9c on an inner side thereof, the wall 9c extending along an edge of the opening 9b and upstanding therefrom. The wall 9c is press-inserted in a fixing hole 20 formed in the movable bracket 3, whereby the movable telescopic member 9 is fixed to the movable bracket 3. The movable telescopic member 9 is formed with an abutment portion 9d on an outer side thereof. The abutment portion 9d includes a pair of ridges extending along longitudinal sides of the movable telescopic member. An abutment surface 9d1 of the abutment portion 9d is pressed against an inner side 4a of the stationary bracket 4 when the steering jacket 1 is fixed to place. When the steering jacket is released, the steering jacket 1 is subjected to the tilting and telescopic motions with the abutment surface 9d1 slidably moved on the inner side 4a or slightly spaced away from the inner side 4a. On the outer side of the movable telescopic member 9, the other portion than the abutment portion 9d is formed with contiguous teeth along an axial direction of the steering jacket 1. The contiguous teeth constitute the tooth portion 9a.

Similarly to the movable telescopic member 9, the stationary tilt member 10 also has a rectangular shape and is longitudinally formed with an opening 10b having such a width as to allow the stationary telescopic member 11 to penetrate therethrough. The stationary tilt member 10 is formed with a wall 10c on an inner side thereof, the wall 10c extending along an edge of the opening 10b and upstanding therefrom. The wall 10c is press-inserted in a fixing hole 21 formed in the stationary bracket 4, whereby the stationary tilt member 10 is fixed to the stationary bracket 4. The stationary tilt member 10 is formed with a pair of ridges 10d on an outer side thereof, the ridges extending along longitudinal sides thereof. Contiguous teeth are formed on an outer side of each ridge 10d along a direction orthogonal to the axial direction of the steering jacket 1. The contiguous teeth constitute the tooth portion 10a.

The movable tilt member 12 has a square shape and is centrally formed with an opening 12b having such a size as to allow the stationary telescopic member 11 to penetrate therethrough. The movable tilt member 12 is formed with the tooth portion 12a on an inner side thereof, the tooth portion being meshingly engageable with the tooth portion 10a of the stationary tilt member 10.

The stationary telescopic member 11 has a square-column shape and is formed with a hole 22 having such a size as to allow the clamp bolt 5 to axially penetrate therethrough. The stationary telescopic member 11 is formed with the tooth portion 11a on an inner-side end face thereof, the tooth portion being meshingly engageable with the tooth portion 9a of the movable telescopic member 9. A pair of engaging portions 11c project radially outwardly from a wall surface 11b near an outer-side end face of the stationary telescopic member 11. The pair of engaging portions 11c are formed at places opposite each other via the hole 22. In correspondence to the engaging portions 11c, an annular flange 12d projects radially inwardly from an inside wall surface 12c of the movable tilt member 12 at place near an inner-side end face thereof.

The embodiment has the constitution wherein both the movable tilt member 12 and the stationary tilt member 10 have the openings so that the tooth portion 11a of the stationary telescopic member 11 may be meshed with the tooth portion 9a of the movable telescopic member 9 as penetrating through the movable tilt member 12 and the stationary tilt member 10. Hence, the four members of the movable tilt member 12, stationary tilt member 10, movable telescopic member 9 and stationary telescopic member 11 may be disposed in coaxial relation, so that these members may be assembled easily.

An elastic body 13 for release from meshing engagement is disposed between the movable telescopic member 9 and the stationary tilt member 10 and on an outer side surface of the stationary bracket 4. The elastic body is capable of urging the movable tilt member 12 away from the stationary tilt member 10. The elastic body 13 for release from meshing engagement is formed of a rectangular frame body, the short sides of which are formed with a pair of tongues 14 opposing each other. The tongues are raised in a direction to be spaced away from the outer side surface of the stationary bracket 4.

Interposed between the stationary tilt member 10 and the movable tilt member 12 is a release plate 15 which may be pressed against the movable tilt member 12 and which are capable of pressing the tongues 14 toward the outer side surface of the stationary bracket 4. The release plate 15 includes: a short cylindrical portion 15a having an opening 15c large enough to allow the stationary telescopic member 11 to penetrate therethrough; and a pressing portion 15b extending outwardly from one end of the short cylindrical portion 15a. The pressing portion 15b is formed in pair, including upper and lower portions (as seen in FIG. 3) such as to be able to press on the tongues 14 as pressed thereagainst. The release plate 15 has a width rw slightly smaller than a width tw between the pair of ridges 10d of the stationary tilt member 10. The short cylindrical portion 15a is formed in such a size as to be allowed to penetrate through the opening 10b of the stationary tilt member 10.

Disposed on the opposite side from the tooth portion 11a of the stationary telescopic member 11 or on an end-face 11d side thereof is an elastic body for meshing engagement 16 which is capable of urging the stationary telescopic member 11 toward the movable telescopic member 9. The elastic body 16 for meshing engagement is formed of a rectangular leaf spring and is centrally formed with a hole 16a allowing the clamp bolt 5 to penetrate therethrough. When assembled, the elastic body for meshing engagement 16 is accommodated in a space defined by the inside wall surface 12c of the movable tilt member 12, an inner side of the washer 6 and the end face 11d of the stationary telescopic member 11 (see FIG. 5 and FIG. 6).

Figure 5:
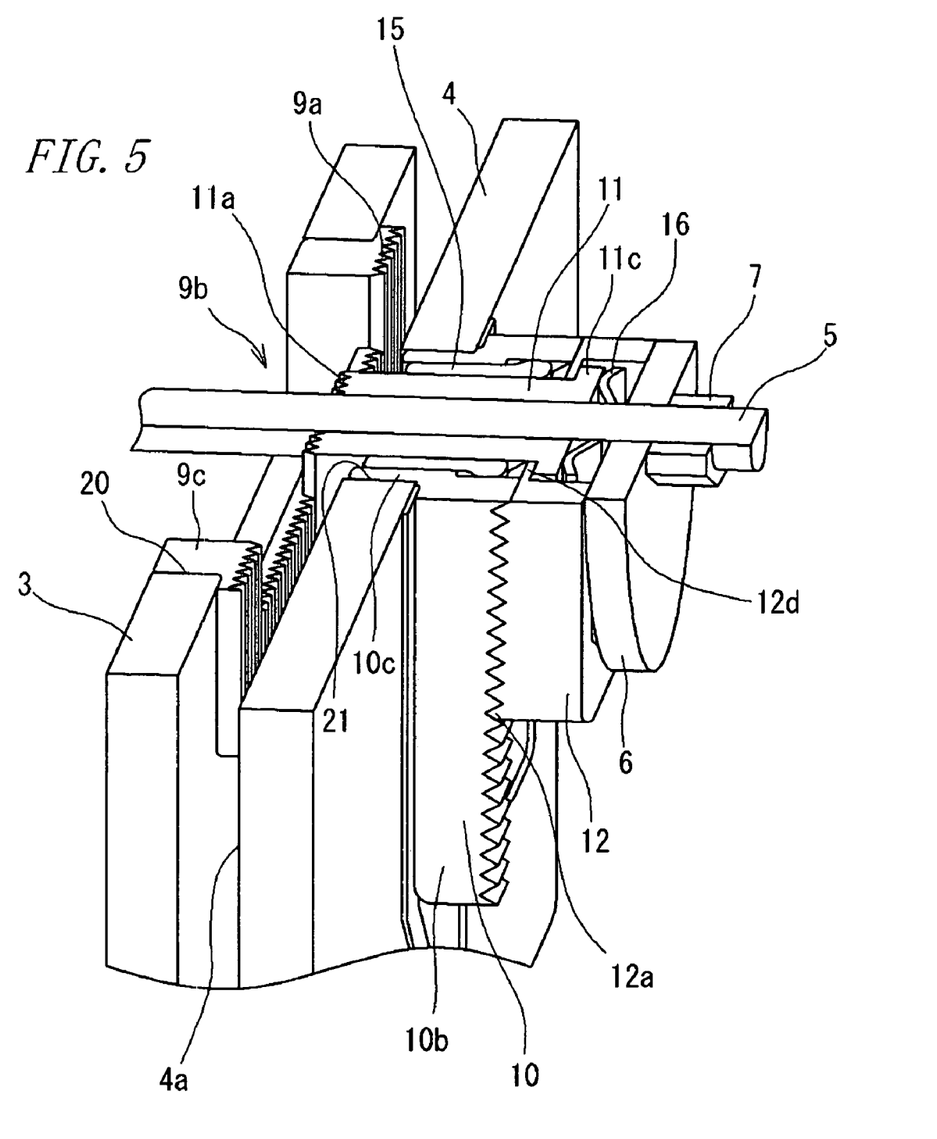
FIG. 5 is a diagram illustrating the essential part brought into fixed state by means of a lever.
Figure 6:
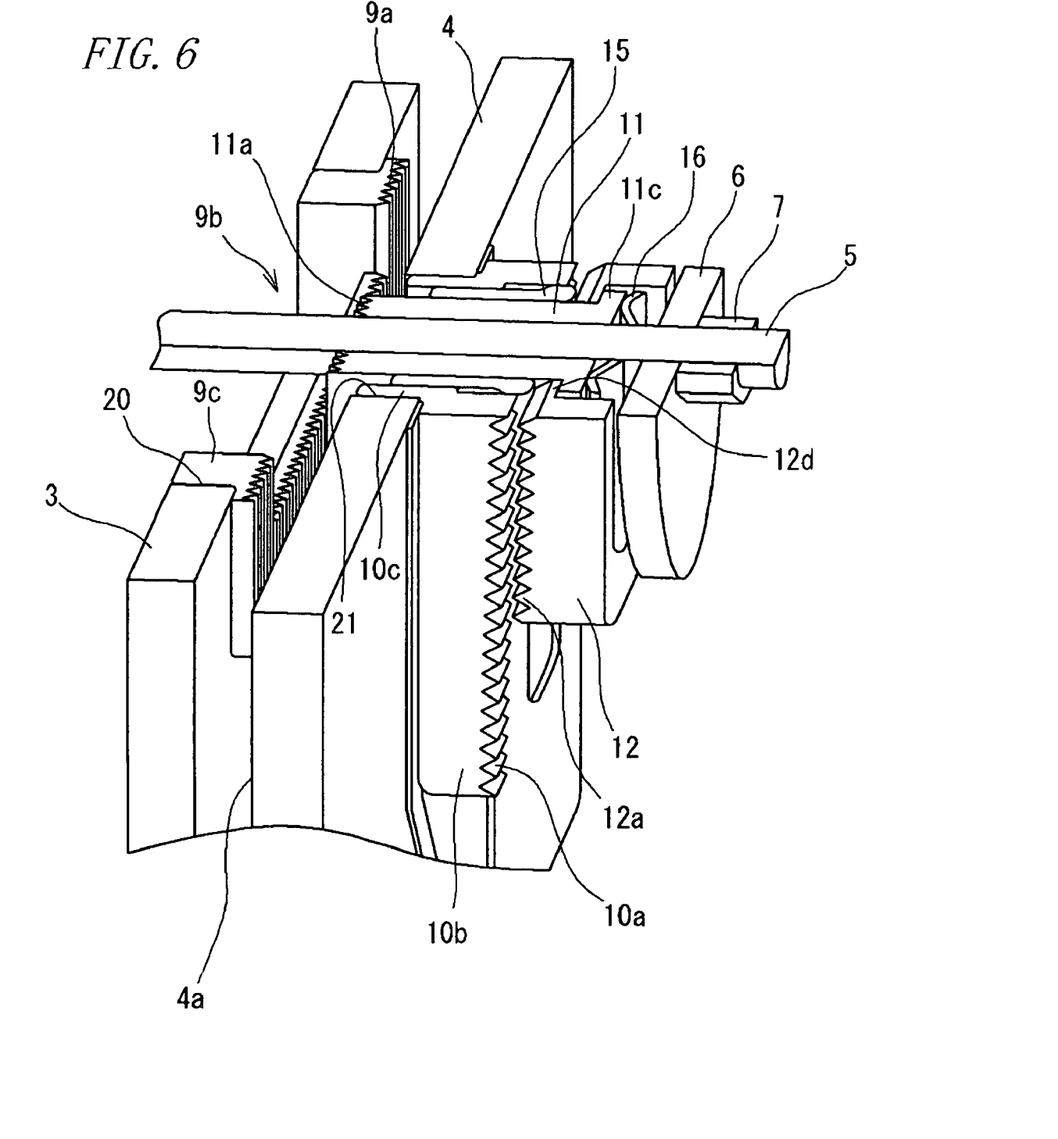
FIG. 6 is a diagram illustrating the essential part released from the fixed state.

Now referring to FIG. 5 and FIG. 6, description is made on operations of fixing and releasing the steering jacket 1 of the adjustable steering apparatus according to the embodiment.

FIG. 5 is a diagram illustrating the essential part clamped by means of the operation lever 8. In this state, the cam mechanism constituted by the slant portions 31a, 32a formed on the opposing surfaces of the first cam 31 and the second cam 32 is operated by turning the operation lever 8, thereby axially moving the washer 6 toward the inner side. Thus, the inner side of the washer 6 is pressed against an outer-side end face of the movable tilt member 12 so that the tooth portion 12a of the movable tilt member 12 is in meshing engagement with the tooth portion 10a of the stationary tilt member 10. On the other hand, the tooth portion 11a of the stationary telescopic member 11 is meshed with the tooth portion 9a as urged toward the movable telescopic member 9 by means of the elastic body for meshing engagement 16. In conjunction with the turning motion of the operation lever 8 in a clamping direction, the inner side of the movable tilt member 12 is pressed against an outer side of the release plate 15 so that the movable tilt member is axially moved toward the inner side along with the release plate 15. Accordingly, the pressing portions 15b of the release plate 15 are pressed against the tongues 14 of the elastic body for release from meshing engagement 13 so as to press on the tongues 14.

In the fixed state, the movement of the movable bracket 3 is inhibited by way of the meshing engagement between the tooth portion of the stationary member and the tooth portion of the movable member. Therefore, the steering jacket 1 is assuredly prevented from being shifted from a set position even though an external force is applied to the steering jacket 1 and the like. Even in a case where the driver hits against an air bag at collision so that an excessive input is applied to the steering jacket 1 via the air bag, the air bag is prevented from being deployed in an improper position thereby achieving a desired performance. Further, the embodiment ensures the meshing engagement with respect to a telescoping direction thereby providing for decoupling between the stationary bracket 4 and a portion (not shown) fixed to the vehicle body at collision.

The embodiment utilizes the elastic force of the elastic body for meshing engagement 16 for accomplishing the meshing engagement between the tooth portion 11a of the stationary telescopic member 11 and the tooth portion 9a of the movable telescopic member 9. The elastic body for meshing engagement 16 can accommodate more dimensional errors as compared with a case where the meshing engagement between the tooth portion 12a of the movable tilt member 12 and the tooth portion 10a of the stationary tilt member 10 and the meshing engagement between the tooth portion 11a of the stationary telescopic member 11 and the tooth portion 9a of the movable telescopic member 9 are both accomplished by way of an axial force of the clamp bolt 5. Therefore, the dimensional accuracies of the finished teeth may be lowered while these members may be assembled easily.

FIG. 6 is a diagram illustrating the essential part released from the fixed state by means of the operation lever 8. In the clamped (fixed) state, the pressing portions 15b of the release plate 15 are pressed toward the outer side by means of the tongues 14 of the elastic body for release from meshing engagement 13, as described above. When the operation lever 8 is turned in a releasing direction, the pressing force axially moves the release plate 15 toward the outer side. The movement of the release plate 15 causes the movable tilt member 12 pressed against the release plate 15 and the washer 6 pressed against the movable tilt member 12 to axially move toward the outer side. In this manner, the tooth portion 12a of the movable tilt member 12 may be shifted from the tooth portion 10a of the stationary tilt member 10 in parallel to the meshing engagement direction, because the elastic body for release from meshing engagement 13 urges the movable tilt member 12 away from the stationary tilt member 10. These tooth portions are assuredly disengaged from each other. The elastic body for release from meshing engagement 13 is formed with the pair of upper and lower tongues 14, which press the release plate 15 and the movable tilt member 12. Therefore, the movable tilt member 12 may be moved away from the stationary tilt member 10 by uniformly applying the pressing force to the movable tilt member 12. As a result, the movable tilt member 12 may be smoothly moved in the releasing direction. Furthermore, the elastic force for release from the meshing engagement may be applied to the movable tilt member 12 by means of the simple structure of the tongues 14.

On the other hand, when the movable tilt member 12 is axially moved toward the outer side, the flange 12d of the movable tilt member 12 comes into engagement with the engaging portions 11c of the stationary telescopic member 11, so that the stationary telescopic member 11 is also axially moved toward the outer side. Thus, the tooth portion 11a of the stationary telescopic member 11 and the tooth portion 9a of the movable telescopic member 9 are released from the meshing engagement. In this case, the stationary telescopic member 11 is forcibly moved in the releasing direction because of the engagement with the movable tilt member 12. This ensures that the tooth portion 11a and the tooth portion 9a are positively disengaged from each other. Hence, the teeth-to-teeth interference may be avoided during the tilting and telescoping operations of the apparatus. Therefore, the positional adjustment of the steering wheel may be smoothly and positively accomplished.

According to the embodiment, the movable tilt member 12 and the stationary telescopic member 11 are mutually independently movable in the axial direction. In other words, the meshing engagement between the tooth portion 12a of the movable tilt member 12 and the tooth portion 10a of the stationary tilt member 10 and the meshing engagement between the tooth portion 9a of the movable telescopic member 9 and the tooth portion 11a of the stationary telescopic member 11 do not affect each other. This negates the need for setting the dimensional accuracies of these finished tooth portions as high as in the case where these tooth portions are simultaneously brought into meshing engagement. As a result, the steering apparatus may be manufactured easily and at lower costs.

The adjustable steering apparatus of the invention is not limited to the foregoing embodiments and the configurations of the individual movable members and the stationary members may be changed or modified as needed. The tongue 14 or the leaf spring constituting the elastic body for meshing engagement 16 may be replaced by, for example, a coil spring.

What is claimed is:

1. An adjustable steering apparatus permitting tilting and telescopic motions of a steering wheel, comprising:
    a movable bracket to which a steering jacket including the steering wheel is fixed and to which a movable telescopic member having a tooth portion is fixedly mounted;
    a stationary bracket which is disposed externally of the movable bracket and fixed to a vehicle body, and to which a stationary tilt member having a tooth portion is fixedly mounted;
    a clamp bolt extending through the movable bracket and the stationary bracket;
    a movable tilt member having a tooth portion meshingly engageable with the tooth portion of the stationary tilt member; and
    a stationary telescopic member having a tooth portion meshingly engageable with the tooth portion of the movable telescopic member,
    wherein the stationary telescopic member has a hole allowing the clamp bolt to penetrate therethrough,
    wherein both the movable tilt member and the stationary tilt member have through holes through which the stationary telescopic member penetrates therethrough,
    wherein the tooth portion of the stationary telescopic member is configured to mesh with the tooth portion of the movable telescopic member by penetrating through the movable tilt member and stationary tilt member, and
    wherein the stationary telescopic member and the movable tilt member are mutually independently movable in such a direction that each tooth portion of the stationary telescopic member and the movable tilt member meshingly engages with the tooth portion of the movable telescopic member and the tooth portion of the stationary tilt member, respectively.

2. The adjustable steering apparatus according to claim 1, wherein a washer capable of contacting with the movable tilt member to press the same toward the stationary tilt member is disposed at one end of the clamp bolt, and wherein an elastic body for meshing engagement is disposed between the washer and the stationary telescopic member, on the opposite side from the tooth portion of the stationary telescopic member, the elastic body being capable of urging the stationary telescopic member toward the movable telescopic member.

3. The adjustable steering apparatus according to claim 2, wherein an engaging portion is formed on the stationary telescopic member, the engaging portion being capable of engaging with a flange formed in the opening of the movable tilt member when the stationary telescopic member is urged by the elastic body for meshing engagement to move toward the movable telescopic member.

* * * * *